(12) United States Patent
Tsubusaki

(10) Patent No.: US 8,610,785 B2
(45) Date of Patent: Dec. 17, 2013

(54) MOVEMENT DETECTION APPARATUS AND MOVEMENT DETECTION METHOD

(75) Inventor: Akihiro Tsubusaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 508 days.

(21) Appl. No.: 12/821,494

(22) Filed: Jun. 23, 2010

(65) Prior Publication Data

US 2011/0025901 A1 Feb. 3, 2011

(30) Foreign Application Priority Data

Jul. 29, 2009 (JP) .................. 2009-177030

(51) Int. Cl.
*H04N 5/228* (2006.01)
*G06F 3/033* (2013.01)

(52) U.S. Cl.
USPC ...................... 348/208.16; 715/863

(58) Field of Classification Search
USPC ............... 348/208.99–208.2, 208.12, 208.16; 324/162; 702/141; 715/863
See application file for complete search history.

(56) References Cited

U.S. PATENT DOCUMENTS

| | | | | |
|---|---|---|---|---|
| 5,714,698 | A * | 2/1998 | Tokioka et al. | 73/865.4 |
| 7,299,149 | B2 * | 11/2007 | Shibayama | 702/150 |
| 7,365,737 | B2 * | 4/2008 | Marvit et al. | 345/156 |
| 8,250,493 | B2 * | 8/2012 | Yang et al. | 715/863 |
| 8,390,579 | B2 * | 3/2013 | Petit et al. | 345/173 |
| 8,393,963 | B2 * | 3/2013 | Okamura | 463/36 |
| 2009/0051648 | A1 * | 2/2009 | Shamaie et al. | 345/156 |
| 2009/0265627 | A1 * | 10/2009 | Kim et al. | 715/702 |
| 2009/0265671 | A1 * | 10/2009 | Sachs et al. | 715/863 |
| 2009/0303204 | A1 * | 12/2009 | Nasiri et al. | 345/184 |
| 2010/0188328 | A1 * | 7/2010 | Dodge et al. | 345/156 |
| 2010/0201616 | A1 * | 8/2010 | Choi et al. | 345/156 |
| 2010/0275166 | A1 * | 10/2010 | Jeon et al. | 715/863 |
| 2010/0328201 | A1 * | 12/2010 | Marvit et al. | 345/156 |
| 2011/0199292 | A1 * | 8/2011 | Kilbride | 345/156 |
| 2012/0016641 | A1 * | 1/2012 | Raffa et al. | 703/2 |
| 2012/0120000 | A1 * | 5/2012 | Lucic et al. | 345/173 |
| 2012/0179965 | A1 * | 7/2012 | Taylor | 715/705 |
| 2012/0254809 | A1 * | 10/2012 | Yang et al. | 715/863 |
| 2012/0256866 | A1 * | 10/2012 | Yu et al. | 345/173 |
| 2012/0272194 | A1 * | 10/2012 | Yang et al. | 715/863 |
| 2012/0280905 | A1 * | 11/2012 | Vonog et al. | 345/156 |
| 2012/0323521 | A1 * | 12/2012 | De Foras et al. | 702/141 |
| 2013/0002538 | A1 * | 1/2013 | Mooring et al. | 345/156 |

FOREIGN PATENT DOCUMENTS

| | | |
|---|---|---|
| JP | 2002-049067 | 2/2002 |
| JP | 2002-296663 | 10/2002 |
| JP | 2006-309064 A | 11/2006 |
| JP | 2009-027398 A | 2/2009 |

* cited by examiner

*Primary Examiner* — Timothy J Henn

(74) *Attorney, Agent, or Firm* — Cowan, Liebowitz & Latman, P.C.

(57) ABSTRACT

A movement detection apparatus that detects a shake added by an operator to execute a function of a device, the apparatus comprises an acceleration detection unit configured to detect accelerations caused by a shake in at least three-axis directions; a determination unit configured to determine an axis with a minimum value of acceleration and an axis with a maximum value of acceleration among the accelerations in at least three-axis directions detected by the acceleration detection unit; a decision unit configured to decide a direction of the shake added by the operator based on the axis with the minimum value and the axis with the maximum value determined by the determination unit; and a selection unit configured to select a predetermined function based on the result of the decision unit.

10 Claims, 7 Drawing Sheets

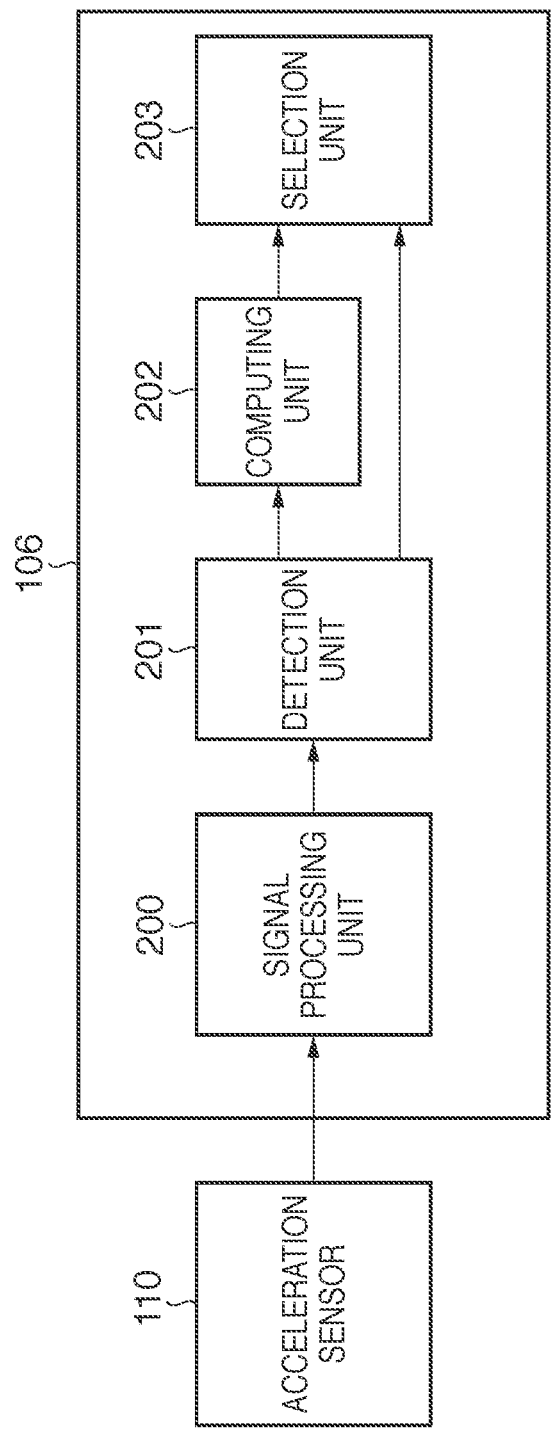

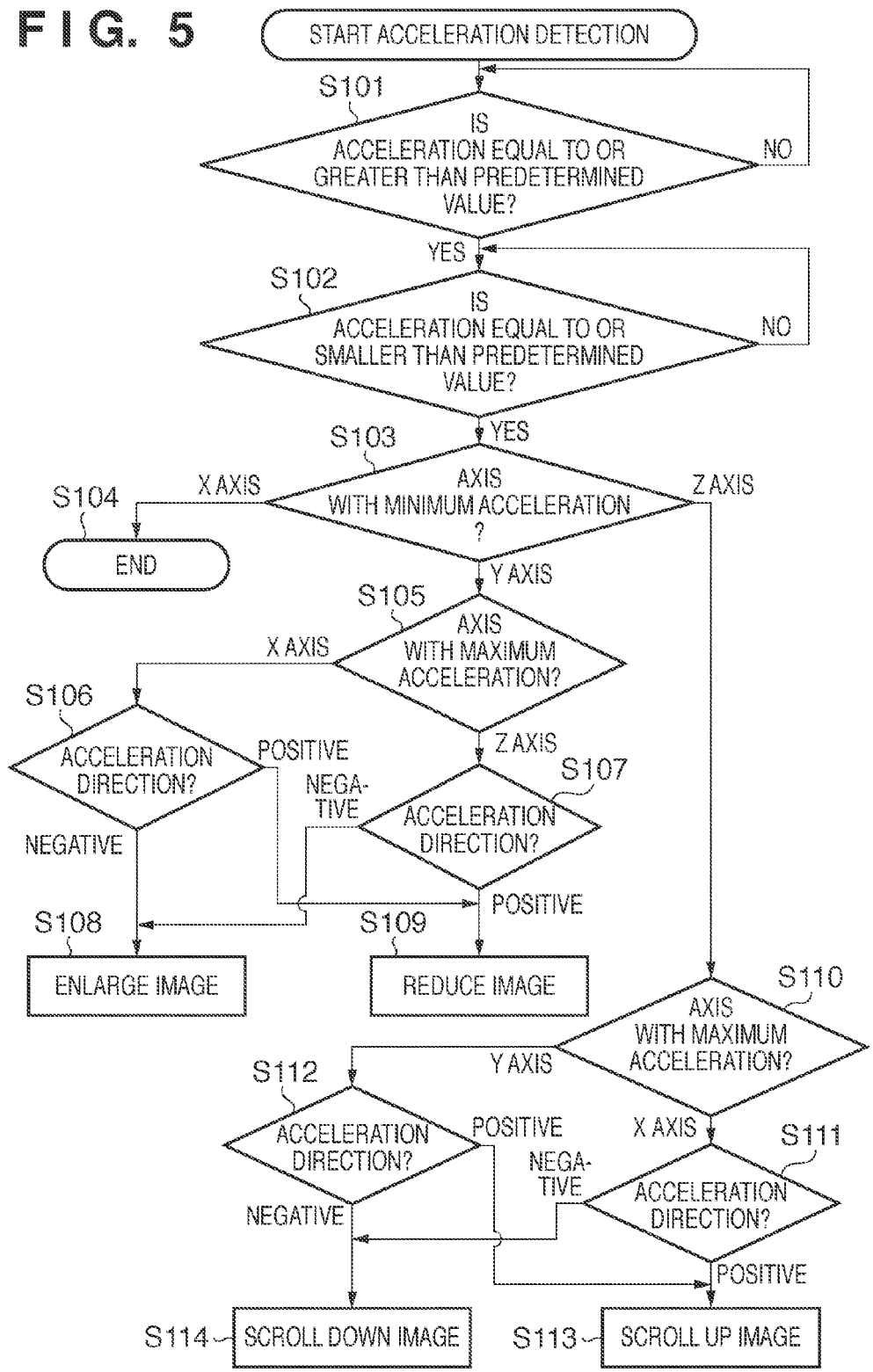

F I G. 7A
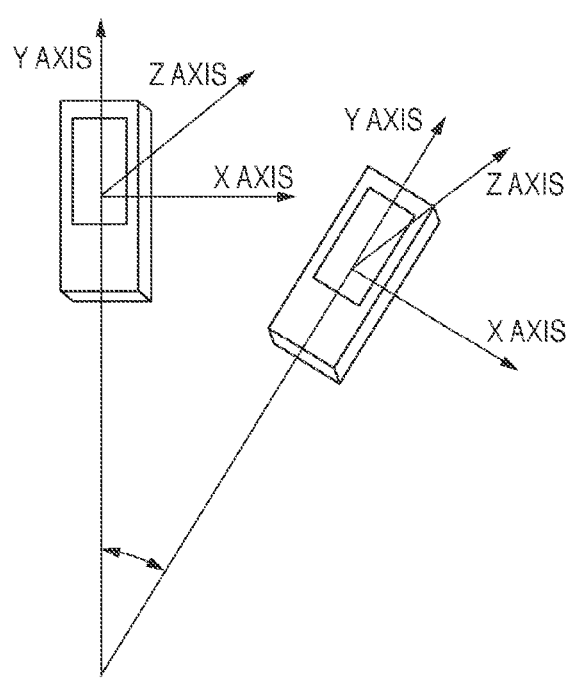
F I G. 7B
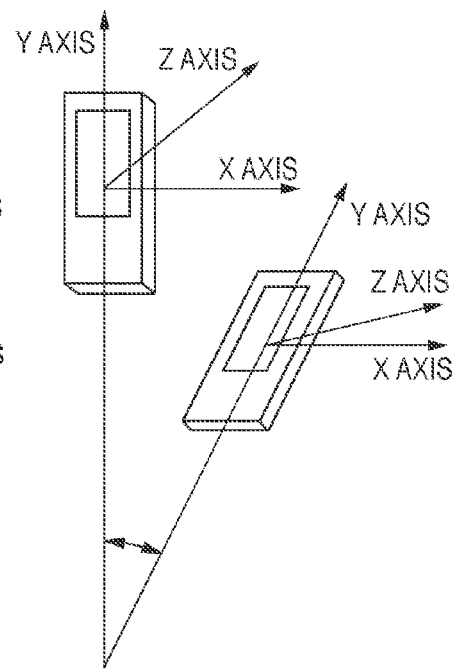

MOVEMENT DETECTION APPARATUS AND MOVEMENT DETECTION METHOD

BACKGROUND OF THE INVENTION

1. Field of the Invention

The present invention relates to a technique of detecting an acceleration when the orientation of an object changes and executing a function of a device in accordance with the detected acceleration.

2. Description of the Related Art

An example of a conventional acceleration detection apparatus includes an acceleration sensor using, for example, means for detecting a change in the electrostatic capacity generated between a movable electrode and a fixed electrode of a sensor based on an acceleration added to an object. In recent years, a three-axis acceleration sensor capable of detecting an acceleration added in any direction of a three-dimensional space by one sensor has been developed. The three-axis acceleration sensor is mounted on a compact digital camera, a cell phone, etc. and can detect a gravity acceleration in the direction of gravitational force when the device is still to detect the orientation and movement of the device. The characteristic that the acceleration in the axis direction, in which the acceleration is generated, changes when the user picks up the device or intentionally shakes the device is used to determine the change in the orientation and movement of the device and the intentional shaking movement. The three-axis acceleration sensor is applied to input means for changing a displayed image or executing an enlargement or reduction function in accordance with the determined orientation and movement of the device or to shake prevention control means for preventing hand shake of camera, etc.

For example, Japanese Patent Laid-Open No. 2002-296663 describes using a three-axis acceleration sensor to detect the orientation of the camera, changing the projection position of date data, etc., and preventing the shutter movement if the acceleration generated by the hand shake is equal to or greater than a predetermined value. Japanese Patent Laid-Open No. 2002-049067 describes a shake prevention function of using a plurality of acceleration sensors to correct a rotational vibration.

However, when the acceleration sensor is used as input means for executing a predetermined function in accordance with an intentional shaking movement of the user, an acceleration generated by an unintended movement of the user, such as putting down the device on a desk or picking up the device, may be detected, and the sensor may be erroneously operated. Furthermore, when a shaking movement in the up and down direction and back and forth direction is determined to change functions allocated to the directions, one axis with the maximum acceleration is detected to decide the shaking direction. However, a shaking direction different from the user's intention may be falsely detected in the method.

SUMMARY OF THE INVENTION

The present invention has been conceived in view of the above problems, and the present invention realizes an acceleration detection technique capable of reducing false detections of accelerations generated by user's unintended movements and reducing erroneous operations of device caused by the false detections.

In order to solve the aforementioned problems, the present invention provides a movement detection apparatus that detects a shake added by an operator to execute a function of a device, the apparatus comprising: an acceleration detection unit configured to detect accelerations caused by a shake in at least three-axis directions; a determination unit configured to determine an axis with a minimum value of acceleration and an axis with a maximum value of acceleration among the accelerations in at least three-axis directions detected by the acceleration detection unit; a decision unit configured to decide a direction of the shake added by the operator based on the axis with the minimum value and the axis with the maximum value determined by the determination unit; and a selection unit configured to select a predetermined function based on the result of the decision unit.

The present invention also provides an image capturing apparatus comprising: a movement detection unit defined above; a display unit configured to display an image; and a control unit configured to execute one of enlargement of image, reduction of image, scrolling up of image, and scrolling down of image in accordance with the direction of the shake decided by the decision unit.

The present invention also provides an electronic device comprising: an acceleration detection unit configured to detect accelerations caused by a shake in at least three-axis directions; a determination unit configured to determine an axis with a minimum value of acceleration and an axis with a maximum value of acceleration among the accelerations in at least three-axis directions detected by the acceleration detection unit; a decision unit configured to decide a direction of the shake added by the operator based on the result of the determination unit; a computation unit configured to count the number of changes in the axis with the minimum value in the acceleration direction; and a control unit configured to execute a predetermined function of the electronic device in accordance with the number of changes counted by the computation unit.

The present invention also provides an image capturing apparatus comprising: an acceleration detection unit configured to detect accelerations caused by a shake in at least three-axis directions; a determination unit configured to determine an axis with a minimum value of acceleration and an axis with a maximum value of acceleration among the accelerations in at least three-axis directions detected by the acceleration detection unit; a decision unit configured to decide a direction of the shake added by the operator based on the result of the determination unit; a computation unit configured to count the number of changes in the axis with the minimum value in the acceleration direction; a display unit configured to display an image; and a control unit configured to execute one of a slide show of an image displayed on the display unit and a rotation of an image in accordance with the number of changes counted by the computation unit.

The present invention also provides a movement detection method of detecting a shake added by an operator to execute a function of a device, the method comprising: an acceleration detection step of detecting accelerations caused by a shake in at least three-axis directions; a determination step of determining an axis with a minimum value of acceleration and an axis with a maximum value of acceleration among the accelerations in at least three-axis directions detected in the acceleration detection step; a decision step of deciding a direction of the shake added by the operator based on the axis with the minimum value and the axis with the maximum value determined in the determination step; and a selection step of selecting a predetermined function based on the result in the decision step.

The present invention also provides a control method of an electronic device, the method comprising: an acceleration detection step of detecting accelerations caused by a shake in at least three-axis directions; a determination step of determining an axis with a minimum value of acceleration and an axis with a maximum value of acceleration among the accelerations in at least three-axis directions detected in the acceleration detection step; a decision step of deciding a direction of the shake added by the operator based on the result in the determination step; a computation step of counting the number of changes in the axis with the minimum value in the acceleration direction; and a control step of executing a predetermined function of the electronic device in accordance with the number of changes counted in the computation step.

According to the present invention, false detections of accelerations generated by user's unintended movements and erroneous operations of device caused by the false detections can be reduced.

Further features of the present invention will become apparent from the following description of exemplary embodiments (with reference to the attached drawings).

BRIEF DESCRIPTION OF THE DRAWINGS

FIG. 3 is a functional block diagram showing an acceleration detection process of the present embodiment;

FIG. 5 is a flow chart showing an acceleration detection process of a first embodiment;

FIGS. 7A and 7B are diagrams explaining a state when a cell phone is intentionally shaken.

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

First Embodiment

Figure 1:
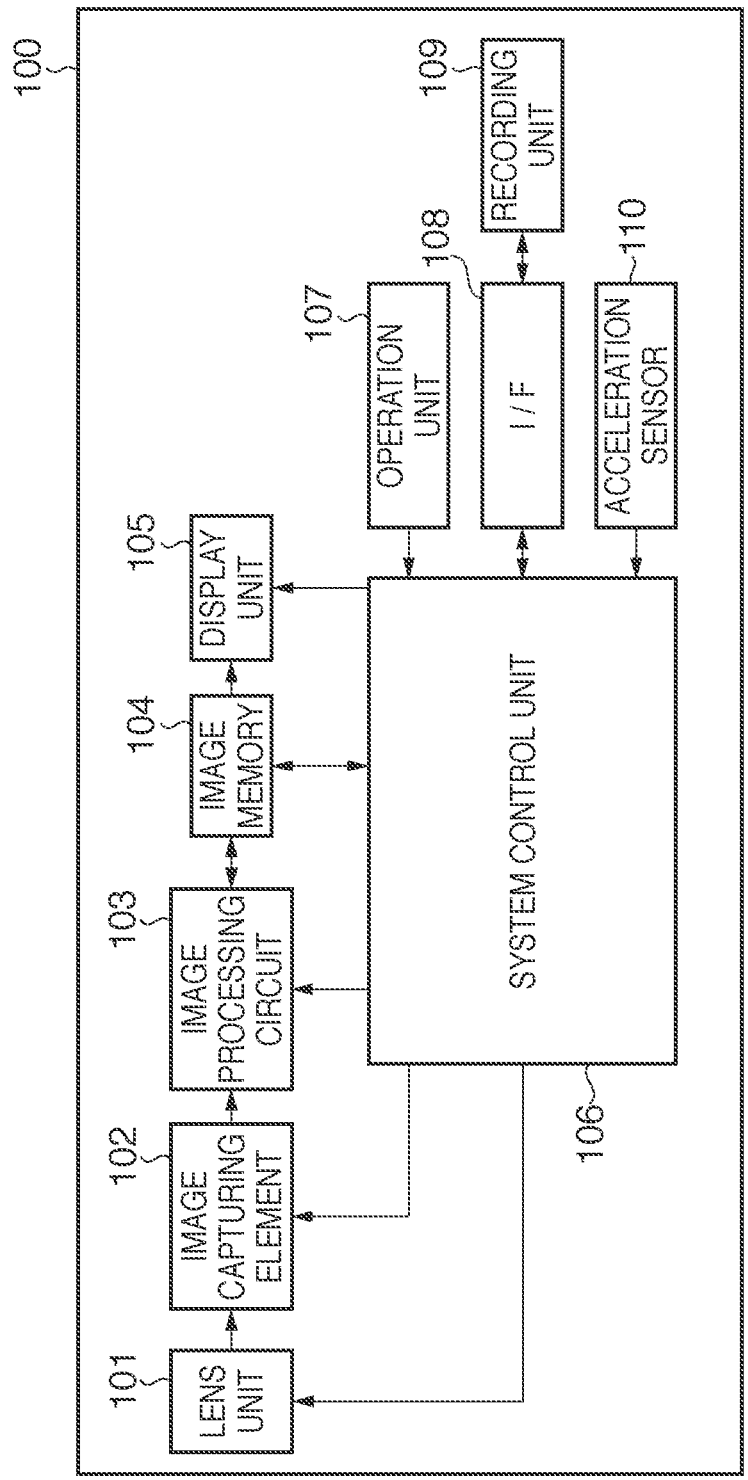
FIG. 1 is a block diagram of an electronic device with an acceleration detection apparatus of the present embodiment mounted thereon.

A configuration of an electronic device of a first embodiment will be described first with reference to FIGS. 1 to 5. In FIG. 1, reference numeral 100 denotes an image capturing apparatus such as a digital camera. In the present embodiment, the image capturing apparatus 100 is a portable image capturing apparatus such as a compact digital camera. Reference numeral 101 denotes a lens unit comprising a zoom lens for adjusting the focal distance to change the angle of view, an aperture shutter for adjusting the light quantity to realize an exposure function, a focus lens for adjusting the focus, etc. The light passing through the lens unit 101 is received by an image capturing element 102, such as a CCD and a CMOS, and converted from a light signal to an electric signal. The photoelectrically converted electric signal is further input into an image processing circuit 103, a pixel interpolation process or a color conversion process is applied to the signal, and the signal is transferred to an image memory 104 formed by a DRAM, an SRAM, etc., as image data.

The display unit 105 is made of a TFT_LCD (thin-film transistor liquid crystal display) etc. The display unit 105 displays the image data acquired by a photographic movement described below and displays specific information (such as photographic information) etc. The system control unit 106 is made of a computation processing apparatus, such as a CPU, and outputs an operational command to a peripheral device in accordance with operation input by the user from an operation unit 107.

The photographic operation and a reproduction operation by the image capturing apparatus 100 of the present embodiment will be described here. The photographic operation starts when the user presses a release button of the operation unit 107. The system control unit 106 sets the aperture position of the lens unit 101 in accordance with the exposure time based on electronic shutter control to obtain an appropriate exposure value or an exposure value set by the user. The system control unit 106 further acquires an AF (auto focus) evaluation value while driving the focus lens of the lens unit 101 and moves the focus lens to the focus position where an AF evaluation value is the maximum to perform AF control to attain optimal focusing. In this state, exposure for the image capturing element 102 starts, and after a certain time, a mechanical shutter of the lens unit 101 is closed to end the exposure. A recording unit 109 connected through an I/F (interface) 108 records the image data generated by the image processing circuit 103. The recording unit 109 reads or writes data to and from a recording medium such as a memory card. The recording medium may be a memory area embedded in the image capturing apparatus 100.

In the reproduction operation, the user operates a selection button of the operation unit 107 to select an arbitrary image from an image list displayed on the display unit 105. The selected image data is transferred from the recording unit 109 to the image memory 104 through the I/F 108. The selected image is displayed on the display unit 105 when the transfer to the image memory 104 is finished. The user can operate the selection button, an enlargement or reduction button, etc. of the operation unit 107 to execute a process of changing the display format, such as scrolling up or scrolling down for changing the displayed images and enlarging or reducing all or part of the displayed images.

An acceleration sensor 110 detects accelerations generated by a movement in three-dimensional directions of the image capturing apparatus 100 as a detection object. For the acceleration sensor 110, there are an analog system for importing a detected acceleration signal as an analog signal by an A/D converter, etc., a digital system for importing a digital signal by serial communication, etc., and so forth. Any system can be applied. The system control unit 106 applies a signal process or a determination process described below to the acceleration signal imported from the sensor to detect a shaking movement relative to the apparatus and selects and executes a function allocated in advance to the apparatus in accordance with the shaking direction. For example, at least one of the functions, such as image scrolling up, image scrolling down, enlargement of displayed image, and reduction of displayed image, is allocated as the function.

Figure 2A:
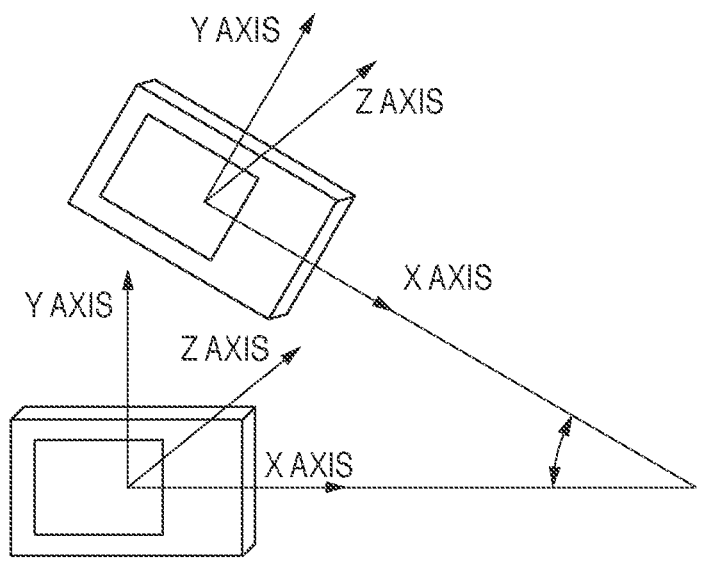
FIGS. 2A and 2B are diagrams explaining a state when an image capturing apparatus is intentionally shaken.
Figure 2B:
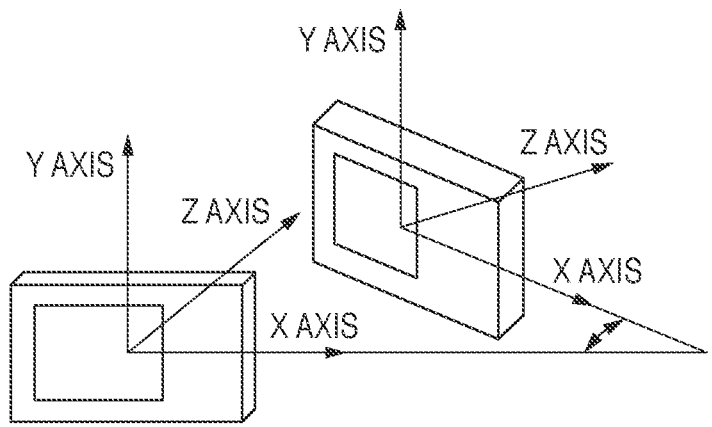

A state when the image capturing apparatus 100 is intentionally shaken will be described with reference to FIGS. 2A and 2B. In FIGS. 2A and 2B, three-axis directions orthogonal to each other are defined as detection directions of acceleration by the acceleration sensor 110. More specifically, a left and right direction (horizontal direction in normal usage) in FIGS. 2A and 2B is defined as an X axis, an up and down direction (perpendicular direction in normal usage) is defined as a Y axis, and a back and forth direction (direction parallel to an optical axis) is defined as a Z axis. The image capturing apparatus 100 as a digital camera is often horizontally long in normal usage. The display unit 105 is arranged on the left side with respect to the center, and the operation unit 107 is arranged on the right side. The image capturing apparatus 100 is configured to be operated mainly by right hand. Although the detection directions are the three-axis directions orthogonal to each other in the present embodiment, detection directions with four or more axes may be arranged in accordance with directions that are particularly desired to be detected, or the detection axes may not be orthogonal to each other.

When the user holds the image capturing apparatus 100 by right hand and shakes the image capturing apparatus 100, the shaking movement is usually performed around the wrist or elbow. Therefore, the acceleration is generated in the direction of rotation around an arbitrary axis. The acceleration sensor 110 detects a translational motion in the X, Y, and Z axis directions. Therefore, if a rotational motion is generated, there is a characteristic that the acceleration of two axes defining the rotary surface is greater than the acceleration of one axis as a rotational axis other than the two axes.

For example, when a shaking movement is performed in the up and down direction, as shown in FIG. 2A, an X-Y plane serves as the rotary surface, and the Z axis serves as the rotational axis in the rotational motion. When a shaking movement is performed in the back and forth direction, as shown in FIG. 2B, a Z-X plane serves as the rotary surface, and the Y axis serves as the rotational axis in the rotational motion. When a user's unintended movement, such as picking up or putting down the apparatus, is performed, a Y-Z plane often serves as the rotary surface in the rotational motion. Therefore, a function allocated in advance to the apparatus is selected when a rotational motion is detected, in which the X-Y plane or the Z-X plane serves as the rotary surface. The selection of function is prohibited when the rotational motion of the Y-Z plane is detected. This can reduce false detections of acceleration generated by user's unintended movements and reduce erroneous operations of apparatus caused by the false detections.

A specific acceleration detection process will be described with reference to FIG. 3. In FIG. 3, an acceleration signal outputted from the acceleration sensor 110 is first input to a signal processing unit 200 of the system control unit 106, and a digital filtering process described below is applied to the signal of each axis direction to convert the signal to facilitate the following processes. A detection unit 201 detects the acceleration generated by the shaking movement of the apparatus. The detection unit 201 detects the start of the acceleration movement when the acceleration in one of the axis directions is equal to or greater than a predetermined value and detects a maximum value of acceleration for each axis in a shaking movement period until the accelerations of all axes are equal to or below the predetermined value. The detection unit 201 detects the axis with the smallest maximum value among the maximum values of acceleration in the three-axis directions to detect the rotary surface.

A computing unit 202 applies a computation process to the acceleration signal of two axes forming the rotary surface, the signal detected by the detection unit 201. In the computation process, a comparison computation process of the accelerations of two axes (first embodiment) and a counting process for counting the number of changes in the accelerations (second embodiment) are executed. A selection unit 203 selects a function allocated based on the acceleration detected by the detection unit 201, the computation result computed by the computing unit 202, or both results. The selection unit 203 does not select the function if the minimum axis detected by the detection unit 201 is a predetermined axis.

Figure 4A:
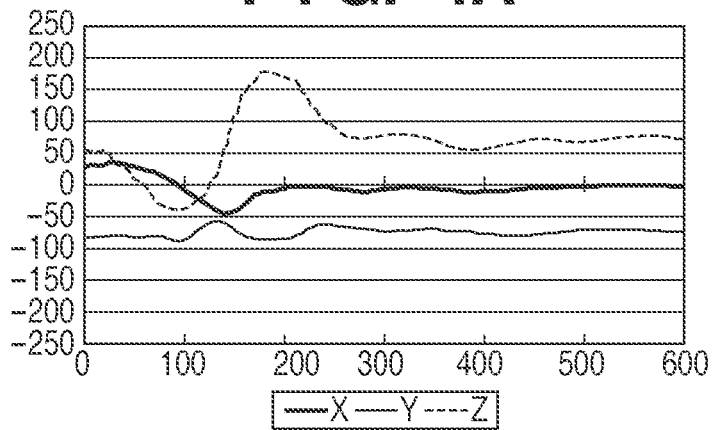
FIGS. 4A to 4C are diagrams explaining signal processing during acceleration detection.
Figure 4B:
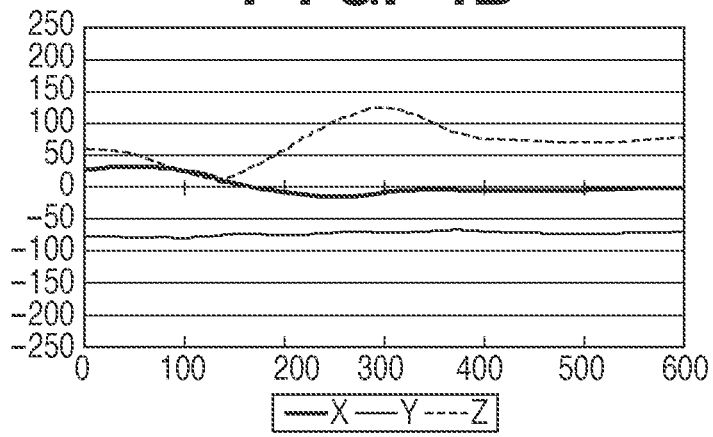
Figure 4C:
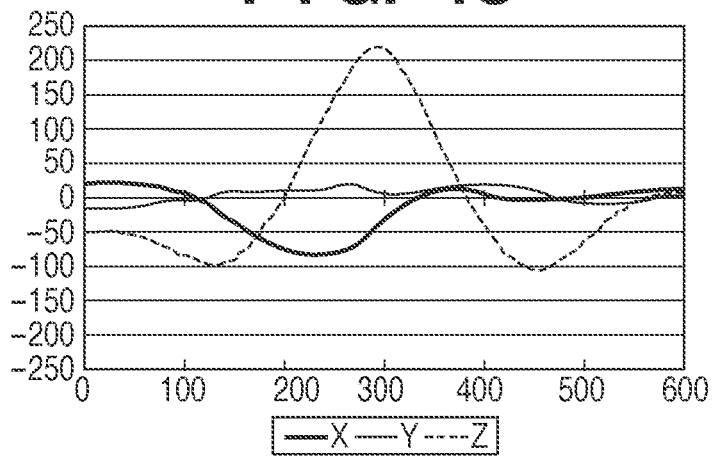

FIGS. 4A to 4C illustrate digital filter signals outputted from the signal processing unit 200. The abscissa denotes time, and the ordinate denotes acceleration. FIG. 4A illustrates a raw signal outputted from the acceleration sensor 110. In the present embodiment, an analog system is used for the output of the acceleration sensor 110. A 10-bit A/D converter converts the raw signal into a digital signal, and the system control unit 106 imports the digital signal. A value of about 511 is shown in a 0G state in which the acceleration is not generated. Only a gravity acceleration 1G is added in the direction of gravitational force when the apparatus is still, and a synthetic vector in the three-axis directions is 1G. In FIG. 4A, the X axis and the Z axis indicate about 0G, and the Y axis indicates about −1G at time 0. It can be recognized that this is a state of a substantially normal position.

FIG. 4B illustrates a signal after a low-pass filter (LPF) process is applied to the raw signal of the acceleration sensor 110. The LPF process removes electrically generated high-frequency noise. FIG. 4C illustrates a signal after a high-pass filter (HPF) process is applied to the signal after the LPF process. The HPF process removes the influence of offset components, such as gravity acceleration, and calculates a variation in acceleration generated by the movement of the apparatus. The execution of processing based on the variation of acceleration allows detection, comparison, and determination processes based on a certain threshold, not based on the orientation.

An absolute value (peak value) of the acceleration in the Y axis direction is the minimum in waveforms of FIG. 4C. Therefore, it can be recognized that the waveforms indicate a shaking movement in the Z-X plane, that is in the back and forth direction. The acceleration in the Z axis direction is the maximum, and the peak value of the acceleration in the positive direction is greater than the peak value of the acceleration in the negative direction. Therefore, it can be recognized that the waveforms indicate a shaking movement in a back to front direction.

The acceleration detection process by the detection unit 201, the computing unit 202, and the selection unit 203 of FIG. 3 will be described with reference to FIG. 5. In the following example, directions indicated by arrows of the axes of FIGS. 2A and 2B denote positive directions, and the shake in the back and forth direction (Z-X plane) and the shake in the up and down direction (X-Y plane) of the apparatus are determined. This is the case in which an enlargement or reduction function of image is selected if the shaking movement is in the back and forth direction, and a display image scrolling up or image scrolling down function is selected if the shaking movement is in the up and down direction.

In step S101 of FIG. 5, for the digital filter signal outputted from the signal processing unit 200, the detection unit 201 determines which acceleration of the three axes has become equal to or greater than the predetermined value and the shaking movement is started. The process moves to step S102 if the acceleration in one of the axis directions is equal to or greater than the predetermined value in step S101. In step S102, the detection unit 201 determines whether the accelerations in all three-axis directions have become equal to or smaller than the predetermined value and the shaking movement is finished. The process moves to step S103 if the accelerations in all three-axis directions are equal to or smaller than the predetermined value in step S102. At this point, the detection unit 201 stores the maximum value of the acceleration in each axis direction in a period from the start of the shaking movement in steps S101 and S102 to the end of the shaking movement.

In step S103, the detection unit 201 compares the maximum values of the accelerations in the axis directions, determines the axis with the smallest maximum value as the rotational axis, and determines the plane formed by the other axes as the rotary surface. In step S103, if the rotational axis is the X axis in the rotational motion, that is the Y-Z plane is the rotary surface, the process moves to step S104. The detection result of the shaking movement is ignored, and the following processes are prohibited. In step S103, if the rotational axis is the Y axis in the rotational motion, that is the Z-X plane is the rotary surface, the process moves to a comparison process of step S105. The computing unit 202 determines an axis with the maximum acceleration other than the Y axis in the shaking movement in the back and forth direction. If the X axis is determined as the axis with the maximum acceleration in step S105, the process moves to an acceleration direction detection process of step S106, and the acceleration direction of the X axis is determined. If the acceleration of the X axis is determined to be in the negative direction in step S106, the shaking direction is determined to be a back to front direction. In step S108, the selection unit 203 selects an image enlargement process allocated to the shaking movement in the back to front direction. On the other hand, if the acceleration of the X axis is determined to be in the positive direction in step S106, the shaking direction is determined to be a front to back direction. In step S109, the selection unit 203 selects an image reduction process allocated to the shaking movement in the front to back direction.

Similarly, if the Z axis is determined as the axis with the maximum acceleration in step S105, the process moves to an acceleration direction detection process of step S107, and the acceleration direction of the Z axis is determined. If the acceleration of the Z axis is determined to be in the negative direction in step S107, the shaking direction is determined to be a back to front direction. In step S108, the selection unit 203 selects an image enlargement process allocated to the shaking movement in the back to front direction. On the other hand, if the acceleration of the Z axis is determined to be in the positive direction in step S107, the shaking direction is determined to be a front to back direction. In step S109, the selection unit 203 selects an image reduction process allocated to the shaking movement in the front to back direction.

If the Z axis is the rotational axis in the rotational motion in step S103, that is the rotational motion of the X-Y plane, the process moves to a comparison process of step S110. The computing unit 202 determines an axis with the maximum acceleration other than the Z axis in the shaking movement in the up and down direction. If the X axis is determined as the axis with the maximum acceleration in step S110, the process moves to an acceleration direction detection process of step S111, and the acceleration direction of the X axis is determined. If the acceleration of the X axis is determined to be in the positive direction in step S111, the shaking direction is determined to be in a down to up direction. In step S113, the selection unit 203 selects an image scrolling up process allocated to the shaking movement in the down to up direction. On the other hand, if the acceleration of the X axis is determined to be in the negative direction in step S111, the shaking direction is determined to be in an up to down direction. In step S114, the selection unit 203 selects an image scrolling down process allocated to the shaking movement in the up to down direction.

Similarly, if the Y axis is determined to be the axis with the maximum acceleration in step S110, the process moves to an acceleration direction detection process of step S112, and the acceleration direction of the Y axis is determined. If the acceleration of the Y axis is determined to be in the positive direction in step S112, the shaking direction is determined to be in a down to up direction. In step S113, the selection unit 203 selects the image scrolling up process allocated to the shaking movement in the down to up direction. On the other hand, if the acceleration of the Y axis is determined to be in the negative direction in step S112, the shaking direction is determined to be in an up to down direction. In step S114, the selection unit 203 selects the image scrolling down process allocated to the shaking movement in the up to down direction.

Although an example of realizing an enlargement function of displayed image, a reduction function of displayed image, an image scrolling up function, or an image scrolling down function in accordance with a shaking movement has been described in the embodiment, the functions are not limited to these. Although an example during image reproduction has been described, the functions may be executed during imaging.

According to the embodiment, false detections of accelerations generated by user's unintended movements and erroneous operations of device caused by the false detections can be reduced.

Second Embodiment

An acceleration detection process of a second embodiment will be described below with reference to FIG. 6. In the example of the present embodiment, a shaking movement of the image capturing apparatus 100 is determined by an axis with minimum acceleration and the number of changes. Two types of slide show functions are allocated depending on the shaking movement in the back and forth direction and the number of movements, and two types of rotation functions of displayed image are allocated depending on the shaking movement in the up and down direction and the number of movements.

Figure 6:
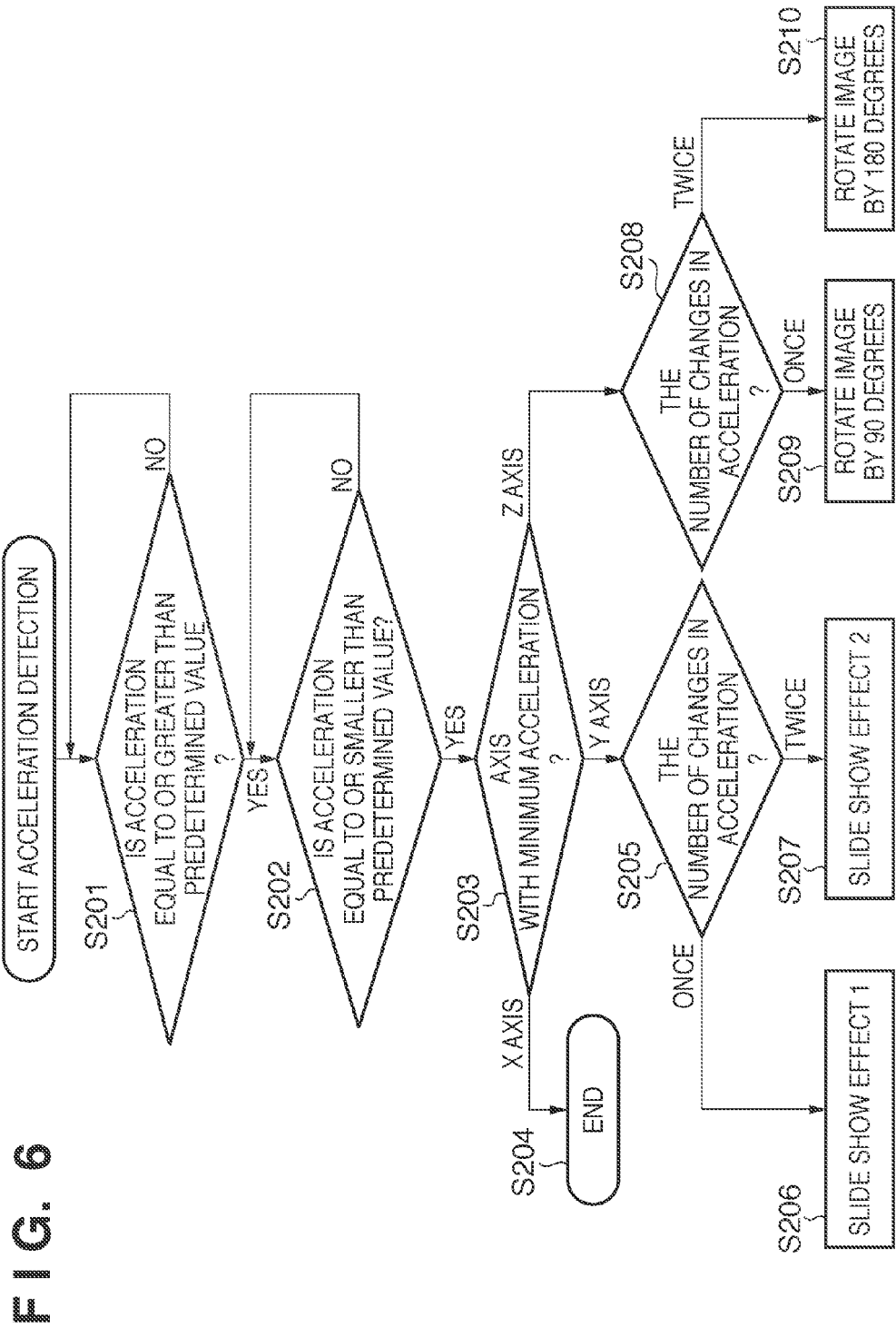
FIG. 6 is a flow chart showing an acceleration detection process of a second embodiment.

Steps S201 to S204 of FIG. 6 are the same as the process of steps S101 to S104 of FIG. 5, and the description will not be repeated. More specifically, in FIG. 6, if the rotational axis is the Y axis in step S203, that is in the rotational motion of the Z-X plane, the process moves to step S205. The computing unit 202 executes a counting computation process of counting the number of changes in the acceleration direction, that is the number of times of shaking movements, in the shaking movement in the back and forth direction. As a result of the counting computation process in step S205, if the shaking movement is once, the process moves to step S206. The selection unit 203 selects a slide show effect 1 as a function for one shaking movement in the back and forth direction. If the shaking movements are twice as a result of the counting computation process in step S205, the process moves to step S207. The selection unit 203 selects a slide show effect 2 as a function for the two shaking movements in the back and forth direction.

Similarly, if the Z axis is the rotational axis in step S203, that is in the rotational motion of the X-Y plane, the process moves to step S208. The computing unit 202 executes a counting computation process of counting the number of changes in the acceleration direction, that is the number of times of shaking movements, in the shaking movement in the up and down direction. As a result of the counting computation process in step S208, if the shaking movement is once, the process moves to step S209. The selection unit 203 selects a function of rotating the displayed image by 90 degrees as a function for one shaking movement in the up and down direction. If the shaking movements are twice as a result of the counting computation process in step S208, the process moves to step S210. The selection unit 203 selects a function of rotating the displayed image by 180 degrees as a function for two shaking movements in the up and down direction.

Although the number of shaking movements in the back and forth direction and the up and down direction is once or twice in the example described in the embodiment, the number of times is not limited to these. Although an example of realizing the slide show function and the image rotation function in accordance with the up/down or back/forth direction of the shaking movement has been described, the functions are not limited to these. Furthermore, although an example during image reproduction has been described, the functions may be executed during imaging.

Third Embodiment

A case in which a cell phone is the detection object will be described with reference to FIGS. 7A and 7B. In FIGS. 7A and 7B, as for the axis directions of the acceleration sensor 110 that detects a shaking movement of the cell phone, the left and right direction (horizontal direction) is defined as the X axis, the up and down direction (perpendicular direction) is defined as the Y axis, and the back and forth direction is defined as the Z axis. The cell phone is often vertically long in normal usage. The display unit 105 is arranged on the upper side with respect to the center, and the operation unit 107 is arranged on the lower side. The cell phone is configured to be operated by holding the lower side.

When a shaking movement of the cell phone is performed in the left and right direction, a rotational motion in the X-Y plane is made as shown in FIG. 7A. When a shaking movement is performed in the back and forth direction, a rotational motion in the Y-Z plane is made as shown in FIG. 7B. When a user's unintended movement, such as picking up the cell phone or putting down the cell phone, is performed, a rotational motion in the Z-X plane is often made. Therefore, a function allocated in advance to the phone is selected when a rotational motion in the X-Y plane or the Y-Z plane is detected, and the selection of function is prohibited when the rotational motion of the Z-X plane is detected. This can reduce false detections of accelerations generated by user's unintended movements and erroneous operations of apparatus caused by the false detections.

Specific processes can be realized by replacing the rotational motion of the Y-Z plane of FIGS. 5 and 6, in which the selection of function is prohibited, by the rotational motion of the Z-X plane.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-177030, filed Jul. 29, 2009, which is hereby incorporated by reference herein in its entirety.

What is claimed is:

1. A movement detection apparatus that detects a shake added by an operator to execute a function of a device, said apparatus comprising:
    an acceleration detection unit configured to detect accelerations caused by a shake in at least three-axis directions;
    a determination unit configured to determine an axis with a minimum value of acceleration and an axis with a maximum value of acceleration among the accelerations in at least three-axis directions detected by said acceleration detection unit;
    a decision unit configured to decide a direction of the shake added by the operator based on the axis with the minimum value and the axis with the maximum value determined by said determination unit; and
    a selection unit configured to select a predetermined function based on the result of said decision unit.

2. The apparatus according to claim 1, wherein
said acceleration detection unit detects the accelerations in the three-axis directions perpendicular to each other, and
said determination unit determines the axis with the minimum value of acceleration as a rotational axis and a plane formed by the other two axes as a rotary surface.

3. The apparatus according to claim 2, wherein
said determination unit starts the determination when one of the accelerations in the three-axis directions is equal to or greater than a predetermined value.

4. The apparatus according to claim 3, wherein
said determination unit ends the determination when all of the accelerations in the three-axis directions are equal to or smaller than the predetermined value.

5. The apparatus according to claim 4, further comprising:
a memory that stores a maximum value of output of each axis by said acceleration detection unit from the start to the end of the determination, wherein
said determination unit compares the maximum values to determine the axis with the minimum value of acceleration and the axis with the maximum value of acceleration.

6. An electronic device comprising the movement detection apparatus according to claim 1, said electronic device further comprising:
a control unit configured to execute a predetermined function of said electronic device based on a selection result of said selection unit.

7. The electronic device according to claim 6, further comprising:
a display unit configured to display an image, wherein
the function is one of enlargement of image, reduction of image, scrolling up of image, and scrolling down of image.

8. An image capturing apparatus comprising:
a movement detection unit according to claim 1;
a display unit configured to display an image; and
a control unit configured to execute one of enlargement of image, reduction of image, scrolling up of image, and scrolling down of image in accordance with the direction of the shake decided by said decision unit.

9. A movement detection method of detecting a shake added by an operator to execute a function of a device, said method comprising:
- an acceleration detection step of detecting accelerations caused by a shake in at least three-axis directions;
- a determination step of determining an axis with a minimum value of acceleration and an axis with a maximum value of acceleration among the accelerations in at least three-axis directions detected in said acceleration detection step;
- a decision step of deciding a direction of the shake added by the operator based on the axis with the minimum value and the axis with the maximum value determined in said determination step; and
- a selection step of selecting a predetermined function based on the result in said decision step.

10. A non-transitory computer-readable storage medium with an executable program stored thereon, wherein the program instructs a microprocessor to perform the method according to claim 9.

* * * * *